3,457,256
SELECTIVE MEMBRANES—A PROCESS FOR ALTERING THE ADSORPTION QUALITIES OF CELLULOSE MEMBRANES
Joseph Steigman, Brooklyn, and Fortunato Stephen Chiccarelli, New City, N.Y.; said Chiccarelli assignor to American Cyanamid Company, Stamford, Conn., a corporation of Maine
No Drawing. Filed May 8, 1967, Ser. No. 636,603
Int. Cl. C08b 15/06, 15/00, 21/00
U.S. Cl. 260—212       10 Claims

ABSTRACT OF THE DISCLOSURE

This invention relates to a method for treating cellulose membranes which comprises contacting the membrane with a carbodiimide followed by treatment of the resultant intermediate with ammonia, an amine or various acids and to the products produced thereby.

BACKGROUND OF THE INVENTION

The field of invention of the instant specification is in the formation of semipermeable membranes which may be utilized for dialysis or the separation of substances in solution by means of their unequal diffusion through such membranes.

The prior art is replete with publications dealing with the general art of dialysis. Very few of these publications, however, are directed to chemically altering the characteristics of the semipermeable membranes so as to modify the reactivity thereof and thereby render them useful for the treatment of other materials. For example, theh following articles or publications have been written with the express intent of disclosing the activity of semipermeable membranes made from cellulose and their effect on the treatment of various materials.

(a) Diffusion and Membrane Technology, American Chemical Society Monograph No. 156, page 190, Tuwiner, S. B.

(b) Dialysis, Chemical Engineering Progress Symposium Series, 24, 127 (1959), Lane, J. A., and Riggle, J. W.

(c) Improved Methods of Preparation of "Permselective" Collodion Membranes Combining Extreme Ionic Selectivity with High Permeability, The Journal of Physical Chemistry, 50, 53–70, (1946), Gregor, H. P., and Sollner, K. J.

(d) Sea Water Demineralization by Means of a Semipermeable Membrane, Dechema Monograph, 17, 707 (1962), Loeb, S., and Milstein, F.

(e) The Acid Properties of Cotton Cellulose and Derived Oxycellulose, Journal of the Textile Institute, 39, 87 (1948), Davidson, G.

(f) The Affinity of Synthetic Membranes for Calcium, Transcript of the American Society of Artificial Internal Organs, 11, 99–103 (1965), Freeman, R. B., Maher, J. F., and Schreiner, G. E.

(g) Adherence of Metals to Cellophane Membranes and Removal by Whole Blood. A Mechanism of Solute Transport During Hemodialysis, Transcript of the American Society of Artificial Internal Organs, 11, 104–111 (1965), Maher, J. F. Freeman, R. B., Schmitt, G., and Schreiner, G. E.

SUMMARY

It has been known that carboxyl groups are formed during the alkaline aging step in the manufacture of cellulose membranes. The ability of said membranes to bind divalent cations from a solution is due to the action of said carboxyl groups on the membrane. We have now discovered that membranes of this type can be altered so as to eliminate their tendency to adsorb such cations. This result is accomplished by treating the cellulose membrane with a carbodiimide, followed by treatment with aqueous ammonia, amines or acids. This reaction converts the reactive carboxyl groups to various amides or anhydrides and the adsorption of polyvalent cations is thereby prevented.

Furthermore, we have found that when aqueous ammonia is utilized, the effect on the membrane is two-fold. First, the adsorption of divalent cations from a 0.00001 molar solution is decreased from about 50% to less than about 5%. Secondly, the time required to reach equilibrium in dialysis is increased from about 4 hours for the untreated membrane to 160 hours for the treated membrane. When mixtures of polyvalent and monovalent cations are placed in solution, a partial separation of the two by dialysis can therefore be effected utilizing our novel membranes.

Substitution of an acid, such as acetic acid, for ammonia results in the formation of an acid anhydride which also decreases the adsorption of polyvalent cations from solution.

Our novel membranes also enable the carrying out of studies of the binding of divalent cations to polyelectrolytes, by equilibrium dialysis, a study previously found difficult because of cation adsorption on the membrane.

Furthermore, our novel membranes may be utilized in the desalinization of sea water and in the separation of ions of different charge type, such as in radio chemical systems of high specific activity. Our membranes may also be utilized in hemodialysis such as in, for example, artificial kidneys, which at the present time are known to cause physiological difficulties because of calcium adsorption.

DESCRIPTION OF THE INVENTION INCLUDING PREFERRED EMBODIMENTS

Our novel procedure comprises reacting a carboxy group containing cellulose membrane with a water-soluble carbodiimide. In this process, any cellulose membrane can be utilized as long as it contains from about 5 carboxyl groups to about 253 carboxyl groups per 1000 units of the cellulose material. For example, we may utilize cellophane, oxy-cellulose (oxidized cellulose) (see Yackel, J. Am. Chem. Soc. vol. 64, page 121, 1942) sausage casings, cotton, paper and the like, It is preferred that the cellulose membrane be substantially metal free, and in this regard, the membrane should not contain metal in a concentration of more than about 100 parts per million.

The reaction of the cellulose membrane and the carbodiimide is conducted at a temperature ranging from about 0° C. to 100° C. but preferably from about 10° C. to about 40° C. and at atmospheric pressure. Subatmospheric or superatmospheric pressure may be utilized if necessary or desired.

The water-soluble carbodiimides which we may utilize generally conform to the formula (I) 

wherein R is an alkyl radical, an aryl radical, a substituted alkyl or aryl radical, a morpholinyl alkyl radical or a piperidyl alkyl radical, and aryl sulfonates thereof. These carbodiimides are well known in the art and those disclosed in U.S. Patent Nos. 2,938,892 and 3,135,748, along with the methods disclosed therein are exemplary. Said patents are hereby incorporated herein by reference. Representative carbodiimides include 1-cyclohexyl-3-[2-morpholinyl-(4)-ethyl]carbodiimide;

1-cyclohexyl-3-[2-morpholinyl-(4)-ethyl]carbodiimide
  metho-p-toluenesulfonate;
1-cyclohexyl-3-(4-diethylaminocyclohexyl)carbodiimide;
1-cyclohexyl-3-(4-diethylaminocyclohexyl)carbodiimide
  metho-p-toluenesulfonate;
1,3-di(4-diethyl-aminocyclohexyl)carbodiimide;
1-cyclohexyl-3-(β-diethylaminoethyl)carbodiimide;
1-ethyl-3-[2-morpholinyl-(4)-ethyl]carbodiimide;
1-ethyl-3-[2-morpholinyl-(4)-ethyl]carbodiimide
  metho-p-toluenesulfonate;
1,3-di-(γ-diethylaminopropyl)carbodiimide;
1-ethyl-3-(γ-dimethylaminopropyl)carbodiimide;
1-cyclohexyl-3-(4-diethylaminocyclohexyl)carbodiimide
and the like.

The process is preferably conducted in the presence of water, however, any material which is a solvent for the carbodiimide and does not interfere with the reaction, i.e. react with the carbodiimide or the cellulose membrane, may be utilized.

The reaction is allowed to proceed for from about 4 hours to 24 hours, i.e. until substantially all the available carboxyl groups are converted, and is carried out by immersing the cellulose membrane in the solvent, e.g. water and adding the carbodiimide in an amount in excess of that stoichiometrically calculated to react with all the available carboxyl groups of the membrane.

If the cellulose membrane, before carbodiimide treatment, contains more than the specified tolerable amount of metal, the metal may be partly or completely removed by soaking the membrane in 0.1 N hydrochloric acid for about 4 hours and subsequently washing it with water.

We have found that our carbodiimide-treated membranes are substantially free of available carboxyl groups since the uptake of divalent ions is markedly reduced.

The carbodiimide-treated cellulose membrane is then contacted, preferably in the presence of water, for from about 15 minutes to about 2 hours, i.e. until substantially complete conversion, with a nitrogen-containing compound having the formula (II) 

wherein $R^1$ and $R^2$ are individually hydrogen, an alkyl radical or a hydroxyalkyl radical. The resultant product is then washed with water, soaked in acetic acid for about 1 hour to destroy any excess non-reacted carbodiimide on the membrane and finally washed with water a second time.

Examples of compounds represented by Formula II, above, include aqueous ammonia, monoethyl amine, diethyl amine, monoethanol amine, diethanol amine, isopropyl amine, n-butyl amine and the like.

When utilizing an amine for the second step in our novel process, we have found that amines containing hydroxyl groups result in amide containing membranes which have available hydroxy groups for cross-linking. Therefore, we have also provided means for producing various other types of membranes whereby the available groups thereof may be utilized to absorb other materials.

As mentioned above, as a substitute for the amine, we may react the carbodiimide-treated cellulose membrane with an acid having the formula (III) 

wherein $R^3$ is an alkyl radical. Such acids include acetic acid, propionic acid, butyric acid, valeric acid, caproic acid and the like.

This reaction is conducted under the same conditions as mentioned above for the nitrogen compound reaction and results in the production of an anhydride.

The following examples are set forth for purposes of illustration only and are not construed as limitations on the present application. All parts and percentages are by weight unless otherwise specified in the present invention.

Example I.—Dialysis procedure for membranes

A portion of an appropriate inorganic working solution (0.00001 M $Ca(NO_3)_2$) is transferred into a bag produced from a carboxy group containing cellulose membrane which is sealed off at one end with a double knot. The other end of the bag is then twisted to reduce the air space and is sealed off with a double knot. The excess tubing is cut away. The bag is then lowered into a glass tube containing the same inorganic working solution and a portion of an inorganic (radioactive tracer) solution. The tube is tightly stoppered with a polyethylene wrapped stopper and sealed with tape. Shaking is performed using a horizontal shaker maintained at 30° C until equilibrium is reached. The bags are removed and quickly rinsed with distilled water. After removal of the excess water, the bag is placed in a clean tube and punctured. The empty bag is removed, quickly rinsed with water and placed overnight in a glass stoppered centrifuge tube containing 1.0 molar HCl to remove the inorganic material adsorbed during dialysis. Equal portions of the inside and outside solutions are transferred to counting vials containing the scintillation solution described below. Activity measurements are performed with a Packard Tri-Carb Liquid Scintillation Spectrometer.

Scintillation solution:
  Naphthalene _____ grams__ 60
  Methanol _____ milliliters__ 100
  Ethylene glycol _____ do____ 20
  p-Dioxane _____ do____ 880
  2,5-diphenyloxazol _____ grams__ 4
  1,4-bis-2-(phenyloxazolyl)-
    benzene _____ milligrams__ 200

With the experiments using $Na^{22}$, 1.0 milliliter portions of these dialyzed solutions are counted directly on a Baird-Atomic Gamma Spectrometer.

In order to count the 1.0 molar HCl used to remove the adsorbed calcium from the membrane, a determination of the quenching effect of the 1.0 molar HCl on the fluorescent is made. The total activity of a 1.0 ml. portion of 1.0 molar HCl in the presence of a scintillator is determined. A redetermination of the total activity after the addition of a 0.2 milliliter spike of radioactive tracer is then made. The percent quenching is calculated and a correction is applied to the sample.

Following the procedure of Example 1, various other experiments are conducted to determine the dialysis of untreated cellulose membranes employing a working solution of 0.00001 M $Ca^{++}$ with $Ca^{45}$ as a tracer. The results are set forth in Table I, below.

TABLE I

| Ex. | Percent activity of $Ca^{++}$ In solution | Percent activity of $Ca^{++}$ in membrane | Total recovery |
| --- | --- | --- | --- |
| 1 | 53.0 | 46.5 | 99.5 |
| 2 | 49.0 | 45.0 | 94.0 |
| 3 | 40.0 | 55.3 | 95.3 |
| 4 | 60.6 | 43.0 | 103.6 |
| 5 | 46.0 | 50.6 | 96.6 |
| 6 | 40.8 | 47.6 | 88.5 |
| 7 | 58.1 | 37.2 | 95.3 |
| 8 | 46.2 | 52.8 | 99.0 |
| 9 | 44.4 | 45.1 | 99.5 |
| 10 | 53.7 | 49.5 | 103.2 |
| 11 | 58.3 | 39.9 | 98.2 |
| 12 | 60.0 | 38.0 | 98.0 |
| 13 | 68.0 | 35.0 | 93.0 |
| 14 | 55.0 | 42.0 | 97.5 |
| Average | 52.4 | 44.8 | 97.2 |

The results of Table I indicate that an average of 44.8% of $Ca^{++}$ is adsorbed by the untreated cellulose membrane, from a 0.00001 molar solution. A series of membranes is prepared as described in Example I and dialyzed with $10^{-3}$, $10^{-4}$ and $10^{-5}$ molar $Na^+$. A 2 milliliter portion of radioactive tracer $Na^{22}$ is added. There is no indication of $Na^{22}$ adsorption on the membrane.

Example 15

A 7 inch strip of commercially available cellulose membrane is soaked overnight in a 0.1 molar hydrochloric acid solution and washed with water. The calcium content of the resultant washed membrane is calculated at 31 parts per million. To a suitable vessel containing 50 parts of water are added 2 parts of 1-cyclohexyl-3-(2-morpholinyl-(4)-ethyl-carbodiimide metho-p-toluene sulfonate. The treated strip of membrane is then soaked in the sulfonate solution for 24 hours. To the vessel is then added 3 parts of aqueous ammonia with stirring. The mixture is allowed to stand for 1 hour and the resultant membrane is then washed thoroughly with water. The membrane is then soaked in a 1.0 molar acetic acid solution for 30 minutes and again washed with water.

Following the procedure of Example 15, three other membranes are prepared. The resultant four membranes are then dialyzed for 96 hours against either 0.0001 or 0.00001 molar $Ca(NO_3)_2$, as described in Example 1. The results of these dialyses are set forth in Table II below along with two controls run on untreated membranes.

TABLE II

| Ex. | Membrane | Molarity | Percent activity $Ca^{++}$ in solution | Percent activity $Ca^{++}$ on membrane | Percent recovery |
|---|---|---|---|---|---|
| 15 | Treated | 0.0001 | 102.8 | 1.1 | 103.9 |
| 16 | Untreated | 0.0001 | 78.8 | 15.7 | 94.2 |
| 17 | Treated | 0.0001 | 98.0 | 0.9 | 98.9 |
| 18 | do | 0.00001 | 91.4 | 3.6 | 95.0 |
| 19 | do | 0.00001 | 98.2 | 4.3 | 102.5 |
| 20 | Untreated | 0.00001 | 57.6 | 35.5 | 93.1 |

The results of Table II show conclusively that the untreated controls adsorbed calcium in the same proportions as they did in the previously described tests, while the carbodiimide and aq. $NH_3$ treated membranes exhibited markedly decreased calcium adsorption.

Example 21

Following the procedure of Example 15, cellulose membranes are treated and separate solutions containing 0.001 and 0.00001 molar sodium are dialyzed therewith as described in Example 1 and in the presence of 0.00001 molar calcium for a period of 4 hours. The results show that the elimination of calcium adsorption by the membranes has no effect on the passage of sodium during dialysis. However, when both the sodium and the calcium are 0.00001 molar, only about 5% of the calcium comes through the treated membrane in 4 hours. This result demonstrates that a separation of calcium from sodium by dialysis can be achieved utilizing our novel membrane.

Following the procedure of Example 15, except that substituted amines are used in place of the aqueous ammonia after the formation of the carbodiimide intermediate, the following results are obtained. The membranes are dialyzed for 4 hours using 0.00001 molar calcium. In all cases, the adsorption of calcium is virtually eliminated.

The results are set forth in Table III, below.

TABLE III

| Ex. | Amine | Percent equilibrium (4 hour dialysis) |
|---|---|---|
| 22 | Monoethylamine | 16 |
| 23 | Diethylamine | 10 |
| 24 | Monoethanolamine | 46 |
| 25 | Diethanolamine | 43 |
| 26 | Isopropylamine | 10 |
| 27 | N-butylamine | 31 |

Example 28

The procedure of Example 15 is again followed utilizing six 7 inch strips of membrane. To a suitable vessel containing 50 parts of water, are added 2 parts of the carbodiimide of Example 15 in water. The membranes are added to this solution and soaked, totally submerged, for 24 hours. The membranes are then transferred to a vessel containing a 1.0 molar acetic acid solution and allowed to stand for two hours. The resultant membranes are washed with water and utilized to dialize a 0.00001 molar calcium salt solution as set forth in Example 1. The adsorption of calcium from the solution is essentially eliminated and the dialysis reaches equilibrium in 4 hours.

Following the procedure of Example 15 treated membranes are prepared with the carbodiimide and the aqueous ammonia. The membranes are utilized to dialyze a 0.00001 molar calcium solution and compared to untreated membranes utilized to dialyze a similar solution. The equilibrium values of the treated and untreated membranes are set for in Table IV below.

TABLE IV

| Ex. | Time (hours) | Percent equilibrium (untreated) | Percent equilibrium (treated) |
|---|---|---|---|
| 29 | 3 | 100 | |
| 30 | 4 | 100 | 10 |
| 31 | 16 | 100 | |
| 32 | 20 | 100 | |
| 33 | 24 | | 17 |
| 34 | 48 | | 53 |
| 35 | 96 | | 69 |
| 36 | 125 | | 87 |
| 37 | 160 | | 100 |

It can thus be seen that the carbodiimide and ammonia treatment of the carboxyl containing membranes changes their dialyses characteristics in that the adsorption of calcium is essentially eliminated and the time required to reach equilibrium is increased from 3 hours for the untreated membrane to about 160 hours for the treated membrane.

Example 38

The procedure of Example 15 is again followed except that an oxycellulose membrane is utilized in place of the cellulose membrane utilized therein. A membrane similar in characteristics to that produced in Example 15, is recovered.

The procedure of Example 15 is again followed except that various membranes, carbodiimides, nitrogen containing compounds and acids are used. The reactants are set forth in Table V, below. In each instance, the resultant treated membrane was materially different in adsorption quality and permeability than its untreated counterpart.

TABLE V

| Ex. | Membrane | Carbodiimide | Nitrogen Compound | Acid |
|---|---|---|---|---|
| 39 | Oxycellulose | 1-ethyl-3-[2-morpholinyl-(4)-ethyl]carbodiimide | Diethyl amine | |
| 40 | Sausage casing | 1,3-di(4-diethyl-aminocyclohexyl)carbodiimide | Aqueous ammonia | |
| 41 | Cellophane | 1-cyclohexyl-3-(4-diethylaminocyclohexyl)carbodiimide metho-p-toluenesulfonate. | | Butyric acid. |
| 42 | That of Example 15 | 1-ethyl-3-(τ-dimethyl-aminopropyl)carbodiimide | | Propionic acid. |
| 43 | do | 1-cyclohexyl-3-(β-diethyl-aminoethyl)carbodiimide | | Caproic acid. |
| 44 | do | Same as Ex. 39 | Diethanolamine | |
| 45 | Oxycellulose | Same as Ex. 40 | N-butylamine | |

We claim:
1. A process for treating a carboxyl group containing cellulose membrane which is substantially free of metal wherein the carboxyl groups thereof are converted to amide or anhydride groups to produce a membrane which will not appreciably adsorb polyvalent cations during conventional dialysis which comprises contacting the cellulose membrane with a carbodiimide having the formula

$$R-N=C=N-R$$

wherein each R is, individually, an alkyl radical, an aryl radical, a substituted alkyl or aryl radical, a morpholinyl alkyl radical or a piperidyl alkyl radical and aryl sulfonates thereof at a temperature ranging from about 0° C. to about 100° C. for a time sufficient to effect conversion of substantially all of the available carboxyl groups in said membrane and then contacting the resultant membrane with a nitrogen-containing compound having the formula $$\begin{array}{c} R^1 \\ \phantom{R}\diagdown \\ \phantom{RRR}NH \\ \phantom{R}\diagup \\ R^2 \end{array}$$

wherein $R^1$ and $R^2$ are, individually, hydrogen, an alkyl radical or a hydroxylalkyl radical, or an acid having the formula $$R^3-\overset{O}{\underset{\|}{C}}-OH$$

wherein $R^3$ is an alkyl radical, for from about 15 minutes to about 2 hours.

2. A process according to claim 1, wherein the carbodiimide is 1-cyclohexyl-3-[2-morpholinyl-(4)-ethyl] carbodiimide metho-p-toluene sulfonate.

3. A process according to claim 1 wherein said carboxyl group containing cellulose membrane is oxycellulose.

4. A process according to claim 1 wherein said nitrogen-containing material is ammonia.

5. A process according to claim 1 wherein said acid is acetic acid.

6. The product produced by the process of claim 1.
7. The product produced by the process of claim 2.
8. The product produced by the process of claim 3.
9. The product produced by the process of claim 4.
10. The product produced by the process of claim 5.

References Cited
UNITED STATES PATENTS 3,380,799 4/1968 Elizer et al. _____ 8—116.2
2,294,924 9/1942 Miller et al. _____ 260—212

HOSEA E. TAYLOR, JR., Primary Examiner

R. W. MULCAHY, Assistant Examiner

U.S. Cl. X.R.

210—22